(12) United States Patent
Gossett et al.

(10) Patent No.: US 6,256,656 B1
(45) Date of Patent: Jul. 3, 2001

(54) APPARATUS AND METHOD FOR EXTENDING COMPUTATIONAL PRECISION OF A COMPUTER SYSTEM HAVING A MODULAR ARITHMETIC PROCESSING UNIT

(75) Inventors: Carroll Philip Gossett; Nancy Cam Winget, both of Mountain View, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/221,911

(22) Filed: Dec. 28, 1998

(51) Int. Cl.[7] .................................. G06F 7/00; G06F 7/38
(52) U.S. Cl. ............................................. 708/650; 708/491
(58) Field of Search ..................................... 708/491, 492, 708/532, 560, 561, 562, 563

(56) References Cited

U.S. PATENT DOCUMENTS

| | | | | |
|---|---|---|---|---|
| 5,493,522 | * | 2/1996 | Rosenberg | 708/491 |
| 5,724,279 | * | 3/1998 | Benaloh et al. | 708/491 |
| 5,905,664 | * | 5/1999 | Ko et al. | 708/491 |
| 6,065,030 | * | 5/2000 | Zhang | 708/491 |

* cited by examiner

*Primary Examiner*—Chuong Dinh Ngo
(74) *Attorney, Agent, or Firm*—Wagner, Murabito & Hao LLP

(57) ABSTRACT

The integers involved in the computation are embedded into a modular system whose index (i.e., its modulus) is an integer M that is bigger than all of these integers involved. In other words, these integers are treated not as belonging to ordinary integers anymore, but as "modular integers" belonging to the modular system indexed by M. Having completed the embedding, CRT provides the bridge which connects the single modular system indexed by M ($Z_M$) with a collection of k modular systems indexed by m1,m2, . . . , mk respectively ($Z_{m1}$, $Z_{m2}$, . . . , $Z_{mk}$), where M factorizes as m1*m2*m3* . . . *mk, and where each mi is slightly smaller than single precision. Then, after numbers are manipulated within modular arithmetic, the answer is reconstructed via the algorithm of CRT, also known as CRA. Finally, the present invention introduces the process of dinking that overcomes the major weakness of implementing division with modular arithmetic. Particularly, within a composite modular arithmetic system, any theoretically impossible modular division is altered slightly [dinked] to a theoretical possible modular division whose quotient is closed enough to the true quotient sought, thus allowing all four arithmetic operations of modular arithmetic in high precision computation.

21 Claims, 16 Drawing Sheets

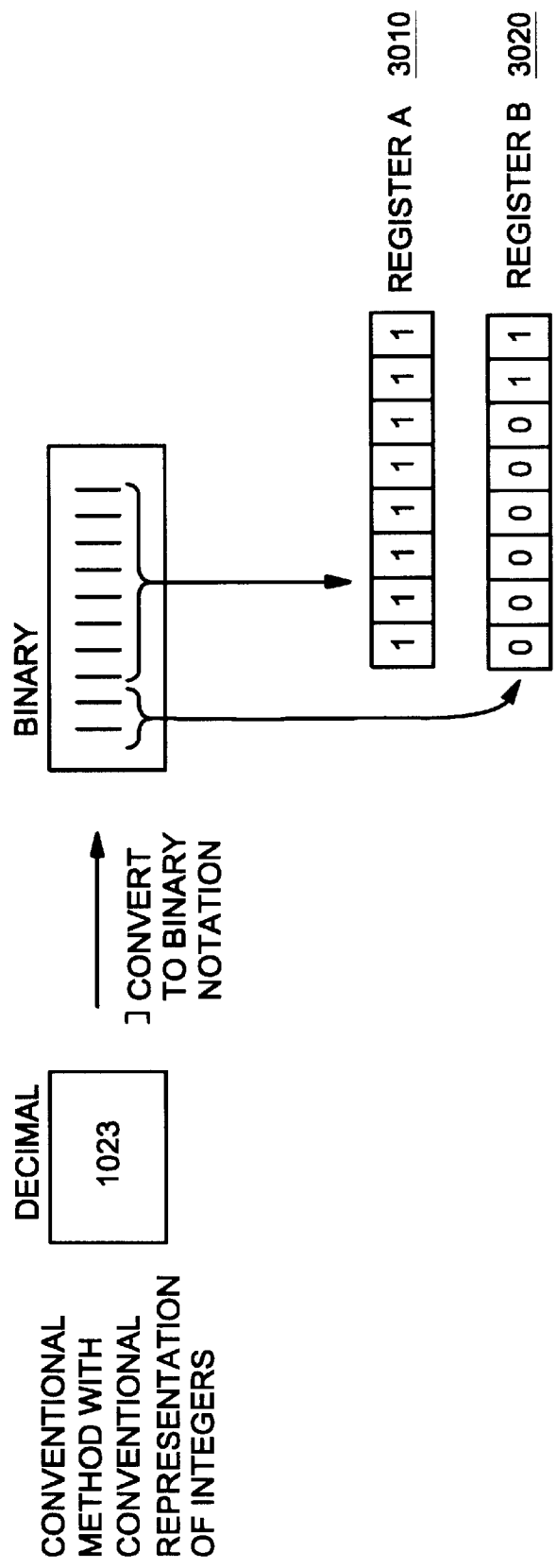

ARITHMETIC SYSTEM : $\mathbb{Z}_6$  4100

| + | 0 | 1 | 2 | 3 | 4 | 5 |
|---|---|---|---|---|---|---|
| 0 | 0 | 1 | 2 | 3 | 4 | 5 |
| 1 | 1 | 2 | 3 | 4 | 5 | 0 |
| 2 | 2 | 3 | 4 | 5 | 0 | 1 |
| 3 | 3 | 4 | 5 | 0 | 1 | 2 |
| 4 | 4 | 5 | 0 | 1 | 2 | 3 |
| 5 | 5 | 0 | 1 | 2 | 3 | 4 |

4120

| × | 0 | 1 | 2 | 3 | 4 | 5 |
|---|---|---|---|---|---|---|
| 0 | 0 | 0 | 0 | 0 | 0 | 0 |
| 1 | 0 | 1 | 2 | 3 | 4 | 5 |
| 2 | 0 | 2 | 4 | 0 | 2 | 4 |
| 3 | 0 | 3 | 0 | 3 | 0 | 3 |
| 4 | 0 | 4 | 2 | 0 | 4 | 2 |
| 5 | 0 | 5 | 4 | 3 | 2 | 1 |

STATIC CLASSIFICATION OF MODULAR ARITHMETIC SYSTEMS

```
                    $Z_1$ $Z_2$ $Z_3$ $Z_4$
                    $Z_5$ .....  $Z_n$
                    .....
                                          4500
```
MODULAR ARITHMETIC SYSTEMS EACH OF WHICH IS INDEXED BY A POSITIVE INTEGER [MODULARS]

```
   $Z_2$ $Z_3$ $Z_5$ $Z_7$
   $Z_{11}$ $Z_{13}$ $Z_{17}$ $Z_{19}$
   $Z_{23}$ ..... $Z_r$ .....
                             4520
```
MODULAR ARITHMETIC SYSTEMS EACH OF WHICH IS INDEXED BY A PRIME INTEGER [MODULARS]

```
   $Z_1$ $Z_4$ $Z_6$ $Z_8$
   $Z_9$ $Z_{10}$ $Z_{12}$ $Z_{14}$
   ..... $Z_c$ .....
                          4540
```
MODULAR ARITHMETIC SYSTEMS EACH OF WHICH IS INDEXED BY A COMPOSITE INTEGER [MODULARS] [i.e., NOT PRIME]

FIG. 4(b)

DYNAMIC RELATIONSHIP AMONG MODULAR ARITHMETIC SYSTEMS

APPARATUS AND METHOD FOR EXTENDING COMPUTATIONAL PRECISION OF A COMPUTER SYSTEM HAVING A MODULAR ARITHMETIC PROCESSING UNIT

FIELD OF THE INVENTION

This invention relates to increasing the fixed-point precision of a digital computer. More specifically, it extends the existing fixed-point single precision of any computer by utilizing multiple processing components. Most significantly, this invention introduces the process of dinking to overcome the problem of performing modular division within a computer system.

BACKGROUND OF THE INVENTION

While performing arithmetic calculations, little thought is usually given to the question of how many decimal digits it takes to represent a number. For example, physicists can calculate that there are approximately $10^{\wedge}78$ electrons in the universe without being bothered by the fact that 79 decimal digits are required to write out that number in full. As another example, someone calculating the value of a function with pen and paper who needs the answer to six significant digits simply keeps intermediate results to seven, or eight, or however many digits are needed. The problem of the paper not being wide enough for seven-digit numbers never arises.

With computers, matters are quite different. On most computers, the amount of memory available for storing a number (single precision) is fixed at the time that the computer is designed. With a certain amount of effort, the programmer can represent numbers two, or three, or even many times larger than this fixed amount, but doing so does not change the nature of this difficulty.

The magnitude of numbers that a computer can represent is finite in nature, whereas the set of number is infinite in nature. Because of this inherent difference, encapsulating infinity with finite means will forever remain a quixotic quest. In fact, this constant clash between the finite confine of a digital computer and the infinity of numbers characterizes the special blend of challenges offered by computer science and computer hardware design in particular. A number whose size is larger than the given computer word size (known as single precision) underscores the fundamental question of how a large integer can be represented by a computer. Therefore, because the size of an integer can be quantified by the number of digits of an integer under consideration, and because the number of digits of an integer is also known as precision, the goal is to extend the precision of a computer word.

Stimulated by problems from computer science, mathematicians have begun to study computational algorithms in their own right. Consequently, new algorithms as well as creative and novel uses of well known classical mathematical algorithms are discovered. On the classical front, for the purpose of extending precision, one example of classical mathematical ideas that can be put to the service of computer science and particularly fixed-point precision extension is the methodology of modular arithmetic.

Modular arithmetic is useful in extending precision because the reformulated way of performing modular addition, modular subtraction, and modular multiplication becomes distributed and is thus more efficient. In particular, the essence of modular arithmetic is the method of "divide and conquer." More particularly, this modular reformulation of arithmetic operations exploits parallelism, whereas the normal methods of performing arithmetic calculations are serial in nature. At the theoretical level, the procedure of representing a given integer n in modular arithmetic is to specify a finite set of k moduli m1, m2, . . . , mk that are "relatively prime" to each other, then divide the given integer n by m1, m2, . . . , mk respectively to obtain k remainders r1, r2, . . . , rk. Next, via the Chinese Remainder Theorem (CRT), this single integer n is reformulated and replaced by its modular representation as a set of k smaller integers, each of which lies within the limit of single precision. Thus, the integer n is denoted as a k-tuple (r1,r2, . . . , rk) or (r1=n mod m1, r2=n mod m1, . . . , rk=n mod mk) to emphasize the fact that the remainder r1 results from dividing n by m1, and so on. Finally, this k-tuple modular representation is converted back to the ordinary number representation by applying the Chinese Remainder Algorithm (CRA) that is at the core of the mathematical proof for the Chinese Remainder Theorem (CRT).

A brief discussion of CRT is highly relevent here because CRT plays a key role in the methodology of modular arithmetic. The story about the Chinese Remainder Theorem can be told in many ways. In a highly abstracted mathematical exposition, one could start with a Dedekind ring and the decomposition of the principal ideal into a product of prime ideals and then proceed further. But such an approach fail to portray the original landscape of CRT: integers and remainders under division. The opposite extreme of telling the story would consist of various numerical examples in the original landscape, with little general theory, or none whatsoever. However, the approach taken here lies between the two extreme approaches mentioned above. Indeed, the story of CRT to be told here can be labeled as application-oriented. During its long history, CRT has appeared in many disguises, never failing to find new aspects of application. An aspect inherent in the very core of CRT is computing: algorithm for taking calculation via a detour where much smaller numbers can be used.

CRT can be classified as belonging to an active field of mathematical research called modular arithmetic because it deals with and makes use of what is called modular arithmetical systems, or simply modular systems. There exists infinitely many modular arithmetic systems, and each of these arithmetic systems is in dexed by a positive integer called the modulus. One specific example of a modular arithmetical system is formed from the set of numbers {0, 1, 2}. In this system called the modular system mod 3, modular addition, modular subtraction, and modular multiplication are characterized by the following two tables:

| + | 0 | 1 | 2 | × | 0 | 1 | 2 |
|---|---|---|---|---|---|---|---|
| 0 | 0 | 1 | 2 | 0 | 0 | 0 | 0 |
| 1 | 1 | 2 | 0 | 1 | 0 | 1 | 2 |
| 2 | 2 | 0 | 1 | 2 | 0 | 2 | 1 |

At the intuitive level, CRT's usefulness can be demonstrated succinctly by the following scenario. If a person secretly selected a number n between 0 and 21, how much more information is needed to discover the selected number n? From the fact that 21 factorizes as 3*7, and with 3 and 7 being relatively prime to each other, CRT guarantees that if the remainder of n divided by 3 and the remainder of n divided by 7 are given, then the secretly selected number can be discovered by using CRA. To use a specific example, if the secretly selected number n between 0 and 21 is equal to 16, then by knowing 1 as the remainder of n divided by 3, and 2 as the remainder of n divided by 7, 16 can be discovered via CRA. Furthermore, to rephrase the above scenario in symbolic form, the 2-tuple (1,2) actually represents the integer 16.

On the other hand, to continue the above example at the more abstract level, CRT says that the structure formed by coupling the mod 3 system and the mod 7 system is equivalent to the structure of the mod 21 system. Or, using the mathematical jargon, these two structures are "isomorphic." That is, whatever arithmetical action (excluding division) is carried out in one structure, the equivalent arithmetical action will also happen in the other structure. Accordingly, CRT can be thought of as the catalyst that enables the swift change for a given number's modular representation to shift from the mod 21 representation to the distributed (mod 3, mod 7) representation, then back to the mod 21 representation again.

One benefit of computing indirectly with integers in their modular representations is that the size of each integer under consideration is reduced to the size of the specified moduli m1, m1, ..., mk. Therefore, doing arithmetic indirectly with modularly represented integers reduces the arithmetic complexity simply because the size of each integer under consideration, which is on the order to M=m1*m2* ... *mk, is reduced to the much smaller sizes of the specified moduli m1, m2, ..., mk. Another benefit of modular representation is in the simple rules of performing addition, subtraction, and multiplication in modular arithmetic. Given two integers a and b with their modular representations of (a1,a2, ..., ak) and (b1,b2, ..., bk) respectively, the rules of modular addition, modular subtraction, and modular multiplication are:

(a1,a 1, ..., ak)+(b1, b2, ..., bk)=(a1+b1, a2+b2, ..., ak+bk);

(a1, a2, ..., ak)−(b1, b2, ..., bk)=(a1−b1, a2−b2, ..., ak−bk);

(a1, a2, ..., ak)*(b1, b2, ..., bk)=(a1*b1, a2*b2, ..., ak*bk).

This set of rules has the two-fold benefits of number size reduction and parallelism. Take the modular multiplication rule for example, each of the number a1, a2, ..., ak is much smaller than the original integer a; in fact, the bigger the integers to begin with, the more pronounced is the reduction in size and arithmetic complexity. At the same time, each of these k products (a1*b1), (a2*b2), ..., (ak*bk) can be completed in parallel. All of these benefits translates into highly precise and highly efficient arithmetic operations tailored to high precision computation on a computer.

Although not implemented as often as the multiple precision representation, the modular representation offers several distinct advantages over the multiple precision representation. One of these advantages is the speed of performing multiplication with the modular representation for extending precision. Whereas n^2 number of operations are required to multiply numbers represented by multiple precision representation, only n number of operations are required to multiply numbers represented modularly. And even with the operations of addition and subtraction, where the two representations are evenly matched in speed, if given a more parallelized computer hardware architecture, performing addition and subtraction is faster with modular representation. In other words, with modular representation, arithmetic operations can be distributed better to take advantage of the multiple processors available. Yet another advantage of using modular representation is in the saving of manufacturing cost. Because modular representation reuses the existing registers to extend precision, designing and manufacturing new and bigger registers are not required.

Given the advantages cited above in favor of using the modular representation to extend precision, one inherent problem remains. This is the problem of performing the operation of division with modular representation. For some modular systems called composite modular systems, performing division is inherently ambiguous and thus impossible even on the theoretical level. Clearly, the major obstacle to be overcome is this last operation of the four arithmetic operations.

If division can somehow be made possible, then the major problem that plagues the implementation of modular arithmetic in high precision computation will be solved. This solution of modular division will in turn enable the full potential of modular arithmetic concepts such as CRT to come to fruition. Given the favorable comparison with the other. methods of high precision computations both in terms of algorithmic efficiency and savings in manufacturing cost, solving the division problem in modular arithmetic will certainly widen the applicability of modular arithmetic in high precision computation and thus further enhance the appeal of implementing modular arithmetic for computation in general. Furthermore, the availability of performing division in modular arithmetic will be the key to a whole new class of applications. Fortunately, as will be shown in the following sections. the present invention provides a unique solution to these problems.

SUMMARY OF THE INVENTION

The present invention pertains to an apparatus and method for extending computational precision by modular representation of a number. More specifically, it applies the ideas of the Chinese Remainder Theorem from modular arithmetic to represent a multi-precision number by first representing each given number with respect to a related set of relatively prime moduli with the aid of the ordinary division algorithm, then operating strictly in terms of each given number's modular representation. Finally, after answers are obtained in the modular representation, the Chinese Remainder Algorithm (CRA) is used to convert the modular representation of the answers back to the ordinary representation. As such, this invention taps into the potential of parallel processing, and decreases the cost of manufacturing new and bigger registers by promoting reuse of existing computer processing components. Therefore, it provides a framework in which hardware reuse can be sustained without sacrificing needed increase in performance.

More significantly, while reaping the benefits of using modular representation to achieve higher precision, this invention also overcomes the most pressing problem facing modular representation of integers, namely, the inherent ambiguity of performing division within certain modular arithmetic systems, and widens the applicability of modular arithmetic to computation in general. The present invention achieves this capability for performing modular division by introducing the process called dinking. Specifically, this invention introduces the process of "dinking" a division deemed theoretically impossible within a composite modular arithmetic system. After dinking is completed on a division, a slightly different division is performed so that the resulting quotient approximates the true quotient within the acceptable error bound of the calculation. Given the fact that a finite device can only approximate true answer within a prior accepted error bound, performing division with the help of dinking becomes a viable operation within a modular arithmetic framework. Consequently, the process of dinking allows divisions within a composite modular arithmetic system so that all four operations of arithmetic become possible even within a modular arithmetic framework.

More specifically, within a composite modular system with the modulus M, the problem of performing division occurs exactly when the divisor is not relatively prime to the modulus M. Instead of performing the impossible modular division, this invention performs a slightly different division with ambiguity under control. This is accomplished by adjusting the divisor using a new divisor that is relative prime to the modulus. This process is referred to as dinking, where the word "dinking" is meant to be suggestive of the process of tidying up the appearance, or the process of adjusting for the better. That is, even though dividing by a modular divisor not relatively prime to the modulus of the modular system is not meaningful, by dinking the modular divisor, or in other words, by dressing up and tidying up the divisor, a slightly different modular divisor that is relatively prime to the modulus is used to replace the original modular divisor. Consequently, this results in a slightly different modular division that is possible within the composite modular arithmetic system; furthermore, the dinked quotient approximates the true quotient within an accepted error bound.

BRIEF DESCRIPTION OF THE DRAWINGS:

The accompanying drawings, which are incorporated in and form a part of this specification, illustrate embodiments of the present invention and, together with the description, serve to explain the principles of the invention.

FIG. 4(a) illustrates the addition table and the multiplication table that characterize $Z_6$, the modular arithmetic system indexed by 6.

FIG. 4(b) illustrates the static classification of modular arithmetic systems.

FIG. 9 also depicts the equivalence between $Z_{135899574657}$ and $Z_{2047} \times Z_{1023} \times Z_{511} \times Z_{127}$ being applied to implement the four hardware processing components.

DETAIL DESCRIPTION

Figure 1:
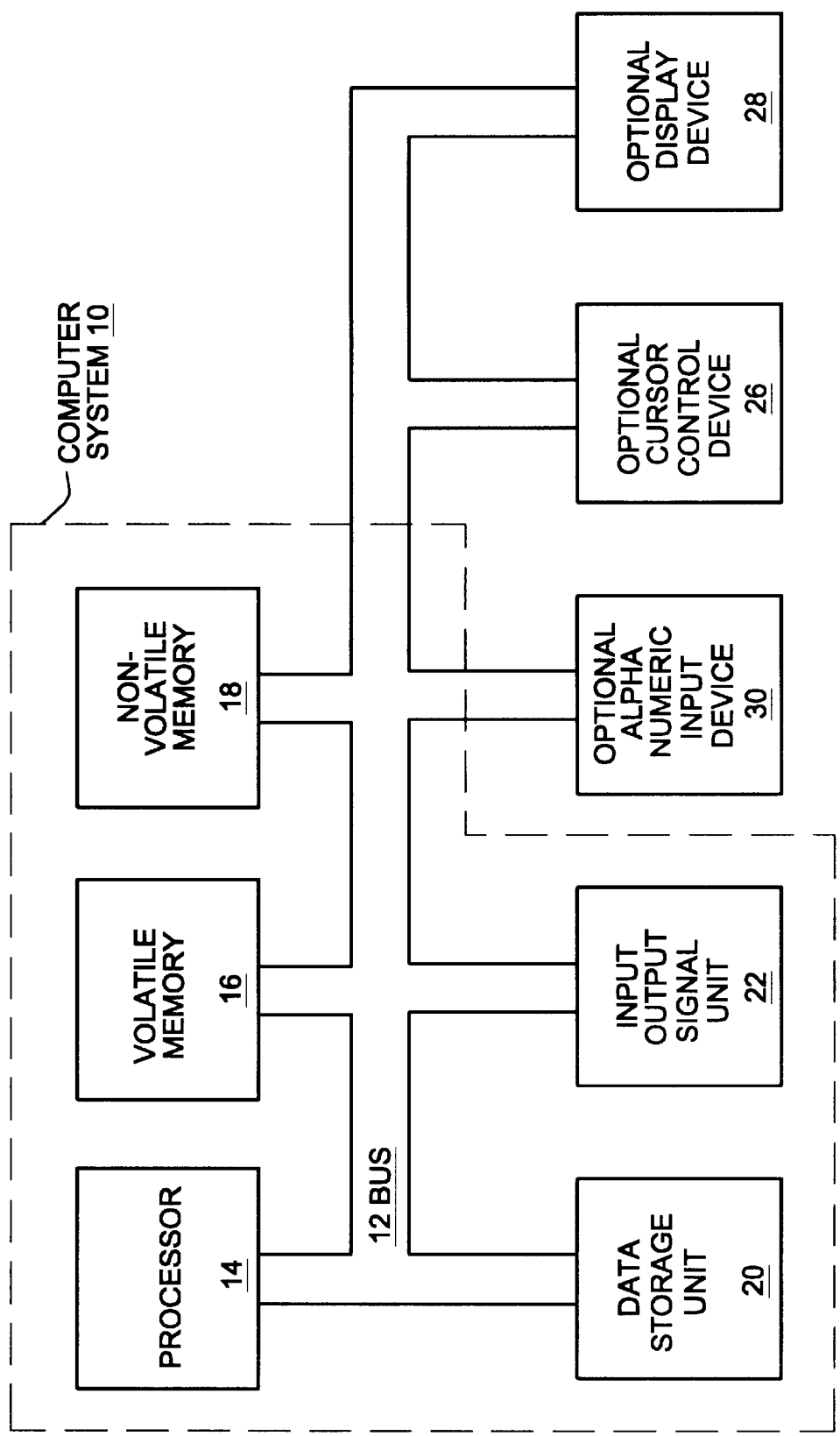
FIG. 1 illustrates an embodiment of a typical digital computer system.

An apparatus of and method for extending single precision of a digital computer by modular arithmetic and dinking is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Nomenclature:

In the following detailed description of the present invention, some of the interchangeable key terms relating to the present invention are collected and defined in the section below to avoid possible ambiguity and to facilitate future reference.

$Z_m$, the modular system m or the mod m system stands for the modular arithmetic system that is indexed by the positive integer m, also known as the modulus of the system.

A modular division or a division mod m refers to a division to be performed that uses strictly the members from the mod m system.

A modular divisor or a divisor mod m refers to the divisor of any modular division mod m. Such a divisor mod m is a non-zero number of the mod m system.

Single precision refers to the size of the memory cell, such as 8-bits wide, 16-bits wide in a computer systems. In other words, single precision refers to how many binary digits can be used to represent an integer by a single memory cell, or the size of the bit pattern that can be accommodated by a single memory cell. On the other hand, single precision also refers to the size of input bit pattern and output bit pattern for a register performing the computations.

CRT stands for Chinese Remainder Theorem.

CRA stands for Chinese Remainder Algorithm.

Dinking refers to the process introduced by the present invention; dinking adjusts a given modular division's divisor that is not relatively prime to the modulus under consideration.

A dink refers to the amount of integer-size increment (either positive or negative) needed to apply to a given modular divisor that is preventing modular division, in order to arrive at a slightly different modular divisor that will allow modular division.

Furthermore, unless specifically stated otherwise as apparent from the following discussion, it is appreciated that throughout the present invention, discussions utilizing terms such as computation, arithmetical operations, addition, subtraction, multiplication, division, and dinking, or the like, refer to the actions and processes of a computer system, or similar electronic computing device. The computer system or similar electronic device manipulates and transforms data represented as physical (electronic) quantities within the computer system's registers and memories into other data similar represented as physical quantities within the computer system memories or registers or other such information storage, transmission, or display devices. Computer system environment of the present invention:

With reference to FIG. 1, portions of the present invention are comprised of the computer-readable and computer executable instructions which reside, for example, in computer system 10 used as a part of precision extension system in accordance with one embodiment of the present invention. It is appreciated that system 10 of FIG. 1 is exemplary only and that the present invention can operate within a number of different computer systems including general-purpose computer systems, embedded computer systems, and stand-alone computer systems specially adapted for precision extension applications. Computer system 10 includes an address/data bus 12 for conveying digital information between the various components, a central processor unit (CPU) 14 for processing the digital information and instructions, a main memory 16 comprised of volatile random access memory (RAM) for storing the digital information and instructions, a non-volatile read only memory (ROM) 18 for storing information and instructions of a more permanent nature. In addition, the computer system may also include a data storage unit 20 (e.g., a magnetic, optical, floppy, or tape drive) for storing vast amounts of data, and an I/O interface 22 for interfacing with peripheral devices (e.g., computer network, modem, mass storage devices, etc.). Devices which may be coupled to computer system 10 include a display device 28 for displaying information to a computer user, an alphanumeric input device 30 (e.g., a keyboard), and a cursor control device 26 (e.g., mouse, trackball, light pen, etc.) for inputting data, selections, updates, etc. It should be noted that any software program involved with precision extension, high precision computation, and dinking can be stored either in main memory 16, data storage unit 20, or in an external storage device.

Figure 2:
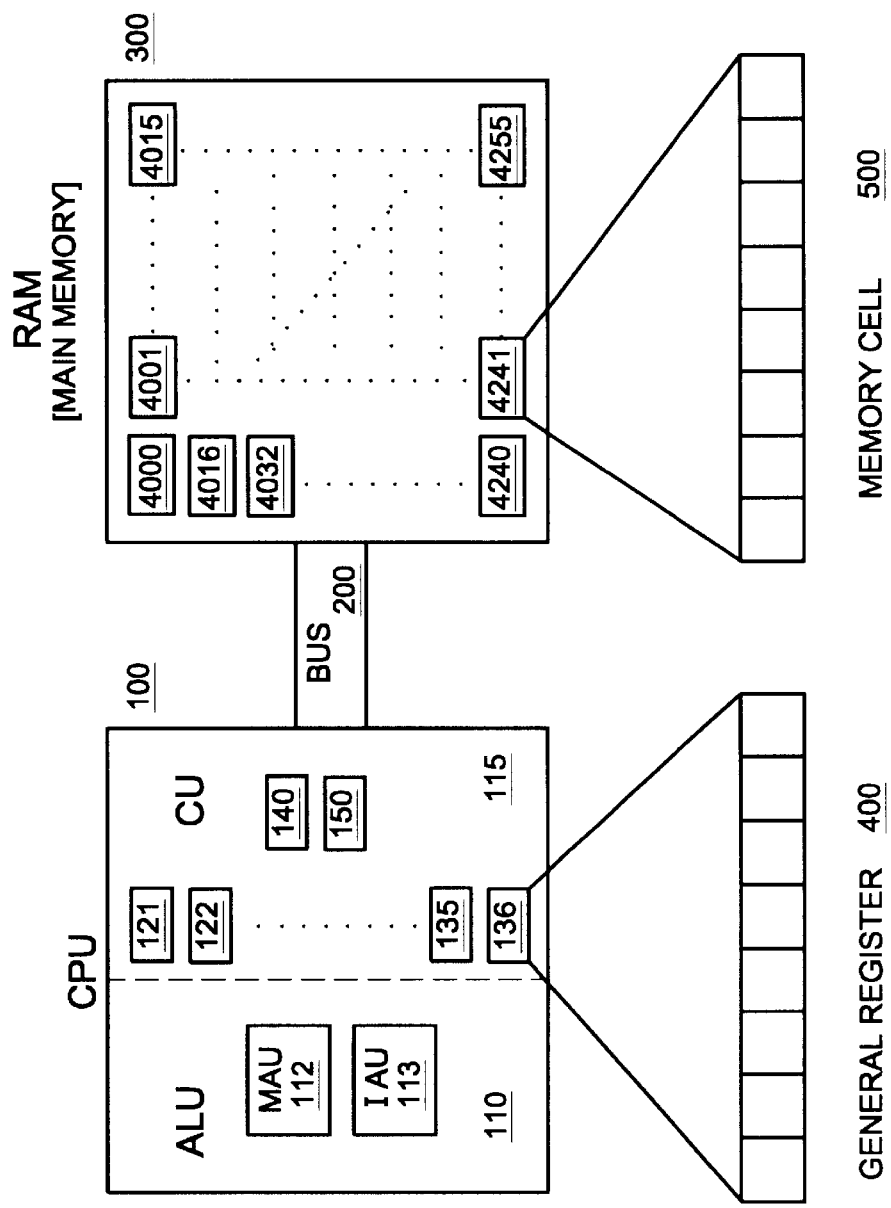
FIG. 2 illustrates an embodiment of a minimal computer system that only includes the hardware computer components essential for the discussion of precision extension.

In FIG. 2, an embodiment of a stripped down version of a computer system is presented. This particular computer system retains only those essential architectural features tailored specifically to illustrate the issues relating to the present invention. FIG. 2 depicts a computer system consists of the CPU 100, the main memory 300, and the bus 200 connecting the CPU 100 and the main memory 300. At the more detailed level. the CPU 100 has 16 general-purpose registers 121~136, each of which is 8-bit wide: the CPU 100 is comprised of the arithmetic logic unit (ALU) 110. and the control unit (CU) 115 having the program counter register 140 and the instruction counter register 150. The arithmetic logic unit 110 comprises a modular arithmetic unit (MAU) 112 and an integer arithmetic unit (IAU) 113. Also, among other functionalities, the control unit 115 is used to determine if an input exceeds single precision. On the other hand. the main memory (RAM) 300 is consisted of 256 memory cells 4000~4255, where each individual memory cell is accompanied by an address between 0 and 255. Consequently, each memory cell is addressed, or identified, by an integer in the range from 0 to 255. Memory cells containing 8 bits are assumed, as exemplified by the enlarged image 500 of the memory cell 4241. Thus, since the general-purpose registers, as exemplified by the enlarged image 400 of the register 136, are used to hold data from memory cells on a temporary basis, each register also consists of 8 bits. Also, the general-purpose register 400 can be used as an input register or an output registers. Consequently, the single precision of this machine is of the size 8 bits, as examplified by both the register 400 and the memory cell 500.

An important consequence of the ordering of both the cells in main memory and the bits within each cell is that the entire collection of bits within a machine's main memory is essentially ordered in one long row. Pieces of this long row can thus be used to store bit patterns that may be longer than the length of a single cell. In particular, if the memory is divided into byte-size cells, one can still store a string of 16 bits merely by using two consecutive memory cells.

The machine depicted in FIG. 2 typically has two ADD instructions: one for adding two's complement representations, and one for adding floating-point representations. This distinction results from the fact that adding bit patterns that represent values coded in binary notation requires different activities within the ALU than when adding values in floating-point notation. However, in this embodiment of the present invention, floating-point representation of numbers is not used precisely because the purpose of modular arithmetic is to implement fixed-point representation. In particular, the motivation of choosing fixed-point representation over float-point representation to extend existing precision comes from the benefit of saving in hardware cost. Consequently, only two's complement representation will be used to demonstrate various concepts and embodiments of the present invention.

The problem of overflow:

One problem not emphasized in FIG. 2 is the fact that whatever numeric systems is introduced for performing computation on a computer, there is a limit to the size of the values that can be represented. For example, in fixed-point representation, when using two's complement with patterns of 4 bits, the value 9 has no bit pattern associated with it. So the correct answer to the problem 5+4 could not be obtained. In fact, the answer would appear as −7. A similar problem arises if patterns of 5 bits are used and the representation of the value 17 is needed. Such an error is called overflow. For a finite entity such as a digital computer, overflow will always be a problem.

The point is that a computer is finite in nature. So anyone using the machine must be aware of the potential of overflow. Of course, because most machines manipulate longer bit patterns than are used here in the computer model of FIG. 2, larger values can be computed without causing an overflow. In fact, many machines uses patterns of 32 bits for storing values in two's complement notation, allowing for positive values as large as 2,147,483,647 to accumulate before overflow occurs. And, if still larger values are needed, the technique called double precision or even multiple precision is often used to extend precision. This means that the length of the bit patterns used is increased two-fold or multi-fold from single precision that the given machine normally uses.

In fact, systems for performing multi-precision arithmetic have long been used to reduce propagated rounding errors and the asymptotic complexity of the best algorithm for the arithmetic operations has steadily improved. Multi-precision arithmetic is the first line of defense in the control of error propagation, but ultimately it only delays the inevitable problems of overflow as more ambitious calculation are mounted and a more fundamental higher precision solution must be found.

Methods of representing numbers and extending precision:

Precision for a computer refers to the size of an integer that can be stored in the register, i.e., the number of digits used to represent an integer. And, to quantify the precision of a computer, the size of the register can be used. For example, a 16-bit register offers more precision than an 8-bit register because $2^{16}$ integers can potentially be represented within a 16-bit register, whereas only $2^8$ integers can potentially be represented within an 8-bit register. The register's size thus determines the limit of the precision on any given computer. Now, in situations where high precision computation is required of a computer, such as signal processing, fluid simulation or fast Fourier transform, the precision actually needed to obtain meaningful solution might exceed the precision offered by the register. Because of this need to perform high precision computation, various methods were devised. In view of the tremendous cost of manufacturing bigger registers, rather than simply design and build bigger registers to accommodate bigger numbers for high precision, various ways were devised to use multiple preexisting registers to represent bigger numbers.

Every method of extending precision basically starts from either multiple precision representation or modular representation. Examples of methods that extend precision of a computer register are double precision representation, multiple precision representation, and modular representation.

FIG. 3(a) illustrates the conventional multiple precision representation of a number. Multiple precision representation means that more than one register are used such that they act in unison to represent various part of a number. For example, in order to represent the decimal number 1023 (or, 1111111111 in the binary notation) with a computer having register size of 8-bit, two of these registers—register A 3010 and register B 3020—would be used in concert so that the register A 3010 stores the first 8 bits from the right of 1111111111, while the second register B 3020 stores the remaining two 1's.

Figure 3B:
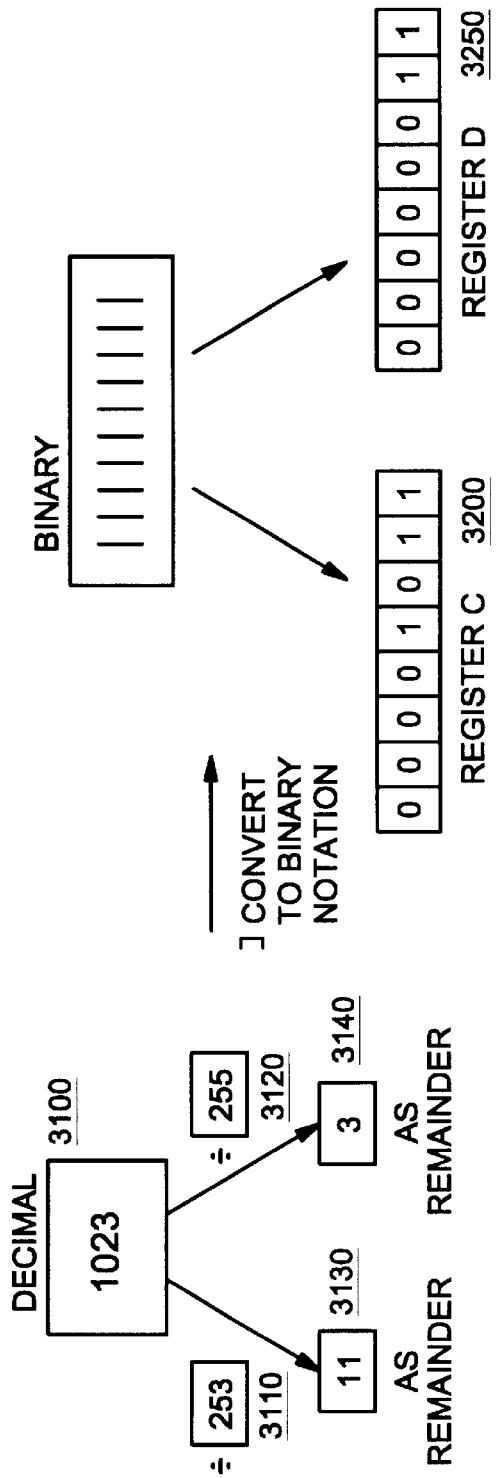
FIGS. 3(a) and (b) illustrate two different ways of representing numbers: the conventional representation and the modular representation.
FIG. 3(c) states the three laws of modular arithmetic: the modular addition law, the modular subtraction law, and the modular multiplication law.

On the other hand, as shown in FIG. 3(b), modular representation of a number also uses multiple registers to represent a number, but this is where the similarity with the multiple precision representation ends. In the case of modular representation, the two registers (3200 and 3250) do not store different parts of a number per se, but instead they store the resulting two remainders (3130 and 3140) of the number after that number has been divided by various strategically chosen divisors known in this case as the moduli 253 (3110) and 255 (3120). Once a number is represented by its own set of remainders, the usual rules of arithmetic operations can no longer be applied to these modularly represented numbers. Instead, the rules of operating with modularly represented numbers must be that of the modular arithmetic.

Figure 3C:
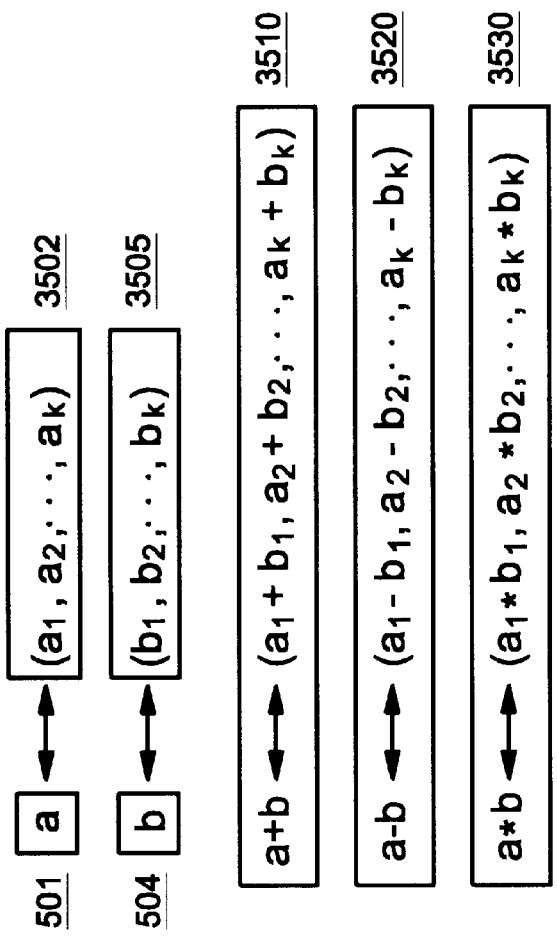

In FIG. 3(c), the three laws of modular arithmetic are illustrated. Two integers "a" 3501 and "b" 3504 are first converted into their respective modular representations (3502 and 3505). Modular arithmetic operations with the modular representation 3502 of "a" 3501 and the modular representation 3505 of "b" 3504 are stated in terms of three laws: the law of modular addition 3510, the law of modular subtraction 3520, and the law of modular multiplication 3530.

Modular arithmetic and CRT:

But what is modular arithmetic? And, how does the methodology of modular arithmetic relate to the usual and familiar arithmetic learned since the first grade? In simple terms, $Z_m$, the modular arithmetic system mod m can be thought of as a miniaturized version of the usual arithmetic system which, except for the process of division, also allows the other three processes of arithmetic (addition, subtraction, and multiplication). In FIG. 4(a), one example of a modular system, the mod 6 system $Z_6$ 4100, is depicted with the help of tables 4120 and 4140. But in fact, with reference to the block 4500 in FIG. 4(b), there exist as many modular arithmetic systems as there are positive integers, i.e., infinitely many of these miniaturized arithmetic systems exist. In other words, each modular arithmetic system is indexed by a unique positive integer. Moreover, these miniaturized arithmetic worlds can be further distinguished into those having a prime modulus and those indexed by a composite (i.e., not prime) number. Each of these in the first group 4520 will be referred to as a prime modular arithmetic system; and each of those in the second group 4540 will be referred to as a composite modular arithmetic system.

Figure 5A:
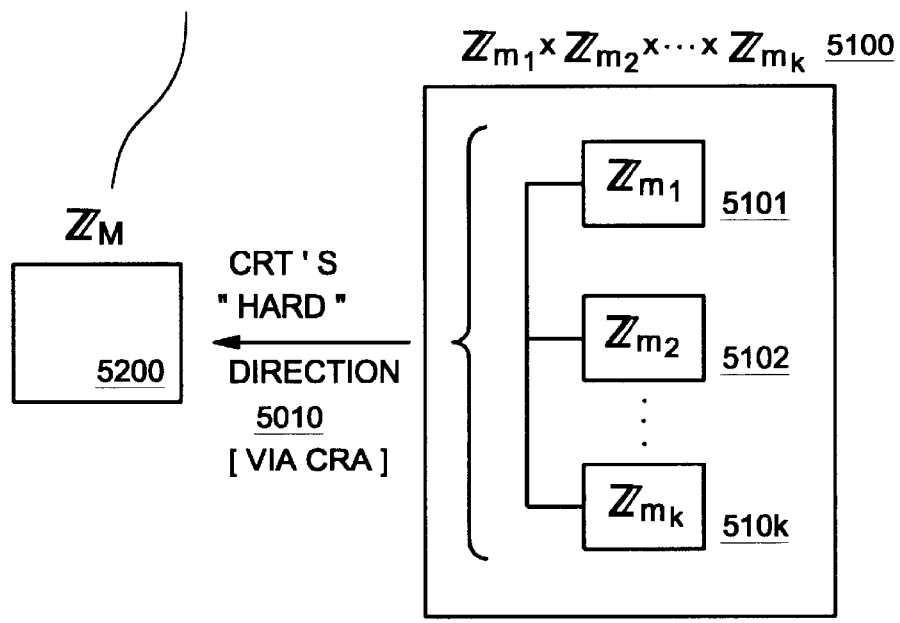
FIGS. 5(a) and (b) both illustrate the dynamic relationships among modular arithmetic systems, and how CRT helps to establish these relationships.
Figure 5B:
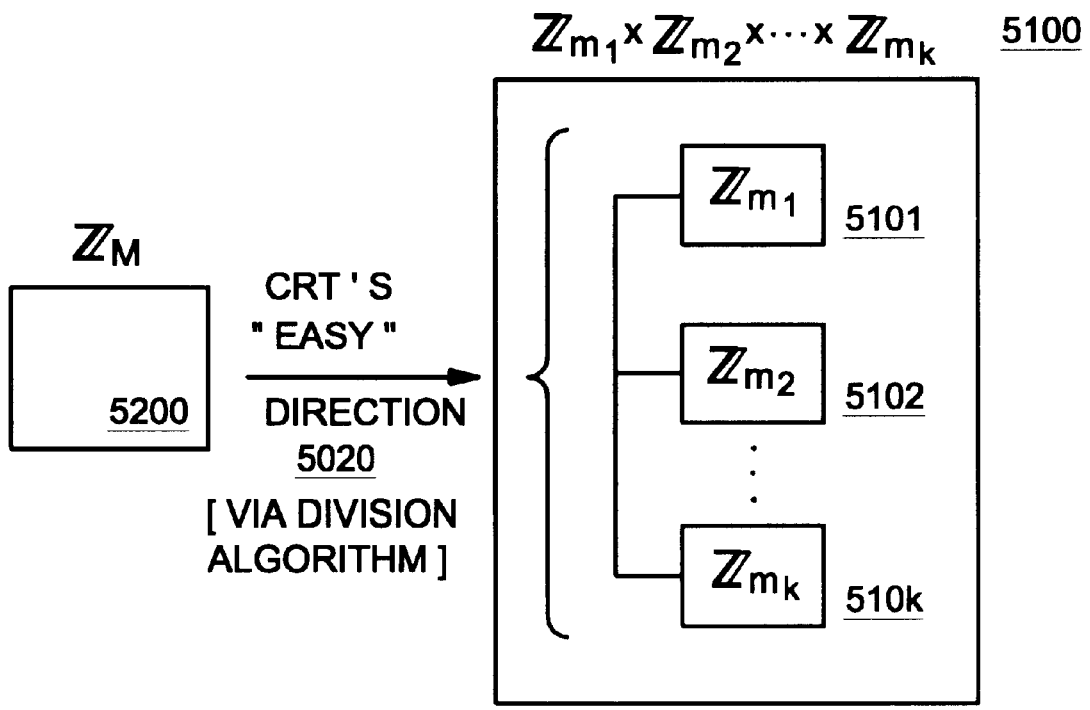
FIG. 5(c) depicts a numeric example of the dynamic relationship between the mod 60 arithmetic system $Z_{60}$ and the coupled modular system of $Z_3 \times Z_4 \times Z_5$.

Having described the static classification of modular arithmetic systems as in FIG. 4(b), the stage is now set for elucidating CRT's role in modular arithmetic. FIG. 5(a) and FIG. 5(b) depict the key dynamic relationship among these miniaturized arithmetic universes as revealed by CRT. Essentially, this key relationship among these modular arithmetic systems is naturally associated with two directionalities, consisting of one "hard" direction 5010 and one "easy" direction 5020.

S FIG. 5(a) illustrates the "hard" direction 5010 while FIG. 5(b) illustrates the "easy" direction 5020. In FIG. 5(a), a collection 5100 of modular arithmetic systems 5101, 5102, . . . , 510k, where m1, m2, . . . , and mk all are relatively prime to each other, is depicted as the starting point. Then, multiplying m1 through mk together to obtain M=m1*m2* . . . *mk, arrow 5010 indicates that going from the coupled modular system 5100 of k modular arithmetic systems 5101, 5102, . . . , 510k to one single modular arithmetic system indexed by M, $Z_m$ 5200, is justified and permitted. That is, the set of numbers (n1,n2, . . . , nk) from the coupled system $Z_{m1} x Z_{m2} x \ldots x Z_{mk}$ 5100, where each ni in (n1,n2, . . . , nk) belongs to $Z_{mi}$, is mapped to one single number n that belongs to $Z_m$. 5200. The arrow 5010 actually indicates the use of CRA to go from the collection $Z_{m1} x Z_{m2} x \ldots x Z_{mk}$ 5100 to $Z_M$, 5200.

FIG. 5(b) depicts the easier direction of going from $Z_M$ 5200 to $Z_{m1} x Z_{m2} x \ldots x Z_{mk}$ 5100. Unlike the other direction where arrow 5010 indicates the application of CRA. this direction 5020 is easier because it only involves the use of ordinary division algorithm. For example, starting with a number n in $Z_M$ 5200, each of ni in (n1,n2, . . . , nk) is obtained by obtaining the remainder of dividing n by mi.

Figure 5C:
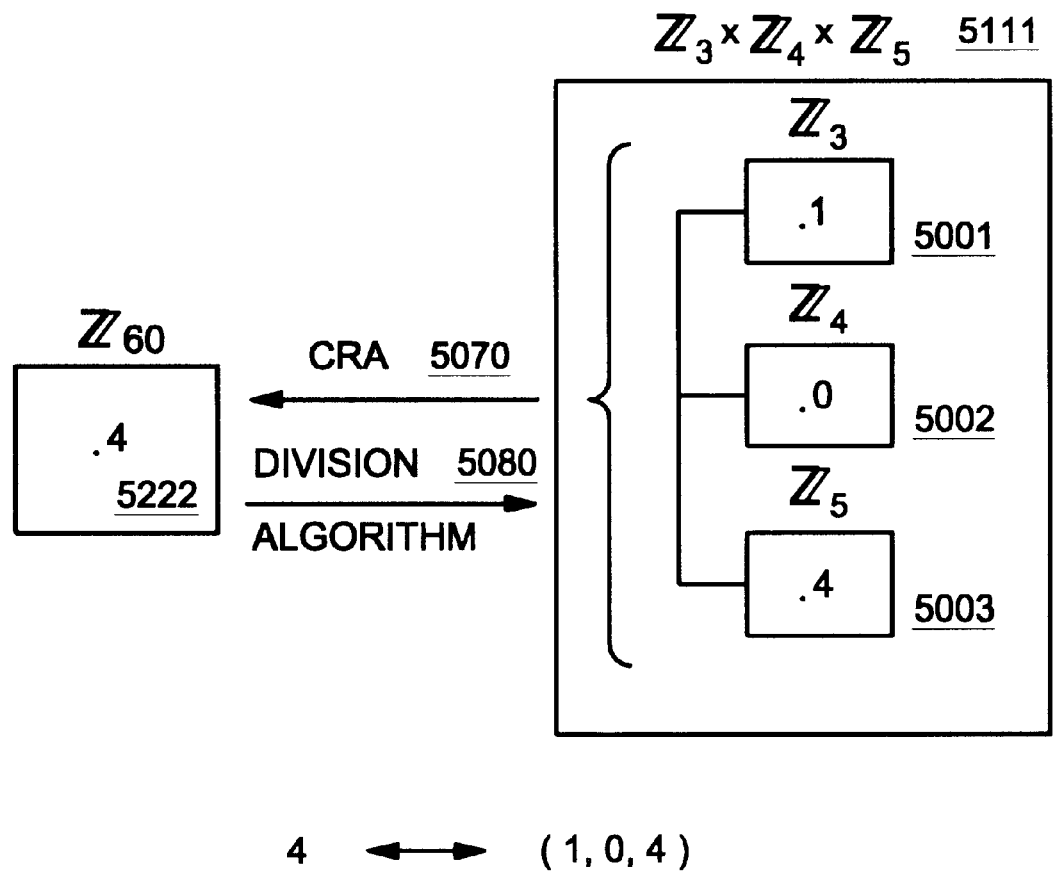

FIG. 5(c) illustrates a simple example of the relation between one single modular arithmetic system $Z_{60}$ 5222 and the coupled system $Z_3 x Z_4 x Z_5$ 5111 of three smaller size modular systems. In more detail, CRT implies that these two systems are naturally related by the factorization of 60=3*4*5, where 3, 4, and 5 are relatively prime to each other. Each number n in $Z_{60}$ 5222 belongs to {0.1, . . . 59}. On the other hand, each number $Z_3 x Z_4 x Z_5$ 5111 is denoted by a 3-tuple (n1,n2,n3) where n1 belongs to {0,1,2}, n2 belongs to {0,1,2,3}, and n3 belongs to {0,1,2.3,4}. For the "hard" direction 5070 involving the use of CRA, if (1,0,4) from $Z_3 x Z_4 x Z_5$ 5111 is given,CRA will give 4in $Z_{60}$ 5222. Conversely, for the easy direction 5080 involving ordinary division algorithm, if 4 in $Z_{60}$ is given, dividing 4 by 3, 4, and 5 respectively gives the three remainders as 1, 0, and 4 respectively. Consequently, 4 in $Z_{60}$ 5222 corresponds to the 3-tuple (1,0,4) $Z_3 x Z_4 x Z_5$ 5111.

Referring back to FIG. 5(a), once CRT gives explicit algorithms such as CRA and ordinary division algorithm to go back and forth between $Z_M$ 5200 and $Z_{m1} x Z_{m2} x \ldots x Z_{mk}$ 5100, the modular representation of an integer can either take the form of one single number in $Z_M$ 5200, or take the form of one k-tuple $Z_{m1} x Z_{m2} x \ldots x Z_{mk}$ 5100. Furthermore, the processes of modular addition, modular subtraction, and modular multiplication can also be carried out either with single numbers in $Z_M$ 5200 or with k-tuples in $Z_{m1} x Z_{m2} x \ldots x Z_{mk}$ 5100.

The Process of dinking:

Recall that in FIG. 3(c), the arithmetic law for performing modular division is conspicuously absent. The reason for the missing modular division law is that performing division in modular arithmetic system turns out not to be as straight forward as doing modular addition, modular subtraction, and modular multiplication. Actually, for each prime modular system, division is meaningful except when dividing by zero: each division represented within a prime modular system can be carried out. For example, in the prime modular arithmetic system indexed by the prime number 5, $Z_5$, all modular divisions can be carried out. However, for each composite system indexed by the composite number M, whenever a division having a divisor b not relatively prime to M is in principle (not just practically) meaningless. With reference to FIG. 4(a), given a composite modular system 4100 indexed by M=6, the division of 4÷2 is not meaningful because 2 the modular divisor is not relatively prime to 6. To give a specific example of the ambiguity, consider the fact that each of the two modular products 2*5 and 2*2 gives the answer as 4 in $Z_6$. Now, the quotient of 4÷2 should be a number q such that q*2=4, but the ambiguity of q arises because both 5 and 2 can be q.

Fortunately, for any composite modular arithmetic system, some modular divisions within a composite modular arithmetic system are not ambiguous. Each of these meaningful modular division shares the characteristics of having a modular divisor that is relatively prime to the modulus of the composite modular system under consideration. In fact the observation of the existence of these meaningful modular divisions is one of the key ingredients in one embodiment of the present invention. If the modular divisor occurring in a modular division is meaningful, i.e., relatively prime to the modulus, then the quotient can be computed. Most significantly, this observation is incorporated into the process of dinking introduced in the present invention as a way of performing modular division in general on a computer. The essence of the dinking process is: even with an ambiguous modular division, its modular divisor can be adjusted slightly, or "dinked", so that a meaningful modular division can be carried out instead on a computer such that the resulting quotient approximates within an acceptable error bound the true quotient sought. As a result, because the replacement of the original ambiguous modular division by a slightly different but meaningful modular division has so little impact on the true quotient sought, the dinked version of the original modular division is computationally equivalent to the original division for the practical purpose of high precision computation with a computer.

Figure 6A:
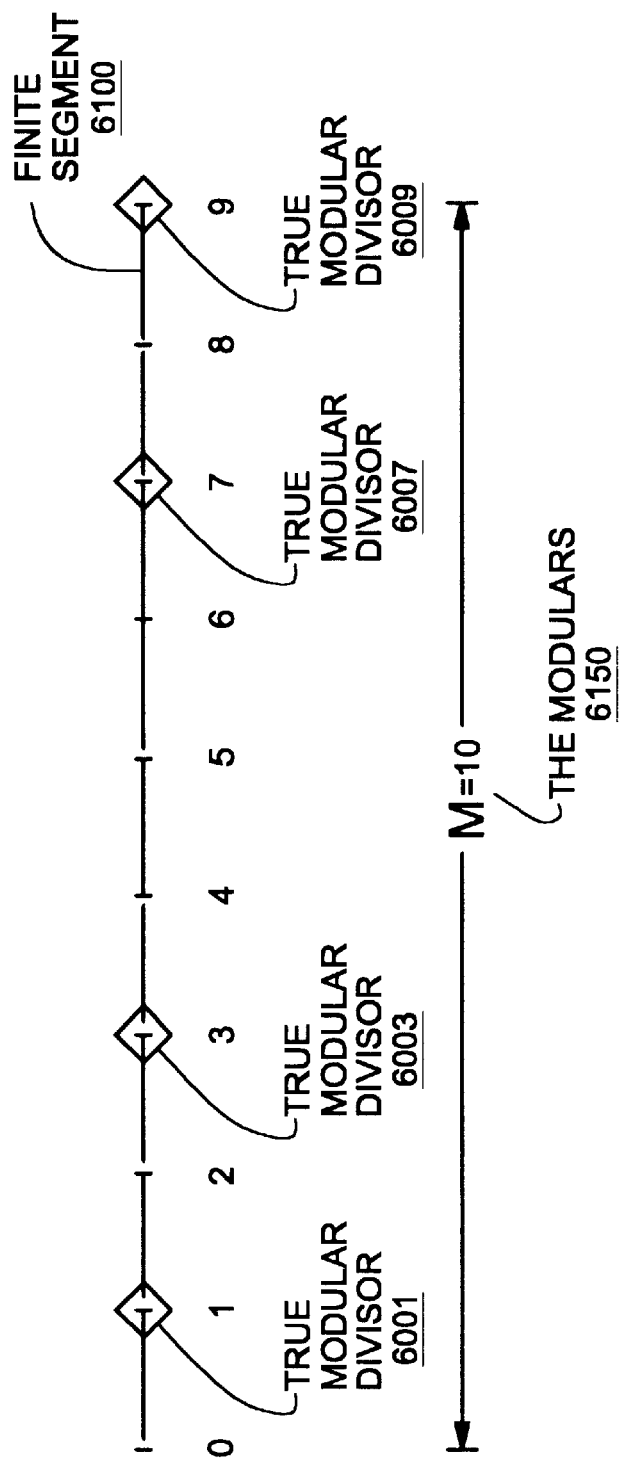
FIG. 6(a) illustrates the mod 6 arithmetic system $Z_6$ by a finite line segment.

In FIG. 6(a), an example is given to illustrate the process of dinking divisions. To set up the proper context for explaining the process of dinking, some preliminary facts are described here in this example. The integer M=10, (6150), denotes the modulus of the composite modular system mod 6, whose members are: 0, 1, 2, 3, 4, 5, 6, 7, 8 and 9, or {0, 1, 2, 3, 4, 5, 6, 7, 8, 9}. Thus, on the finite number line 6100, integer values of 0 to 9 are marked to denote these members of $Z_{10}$ 6050. Furthermore, because the totient function phi of any integer M indicates that phi(M) integers less than M are relatively prime to M, the fact that the totient function phi of M=10 gives 2=phi(4) indicates that four numbers in {0, 1, 2, 3, 4, 5, 6, 7, 8, 9} are relatively prime to M=10, the modulus in this case. Consequently, the mod 10 system $Z_{10}$ 6050 has four meaningful modular divisors. Checking the integers 1 through 9 on the number line 6100, the four integers relatively prime to 10 are found to be 1, 3, 7 and 9, marked and enclosed by rhombuses 6001, 6003, 6007 and 6009 respectively. These four integers are the true modular divisors of the mod 10 system $Z_{10}$ 6050.

Figure 6B:
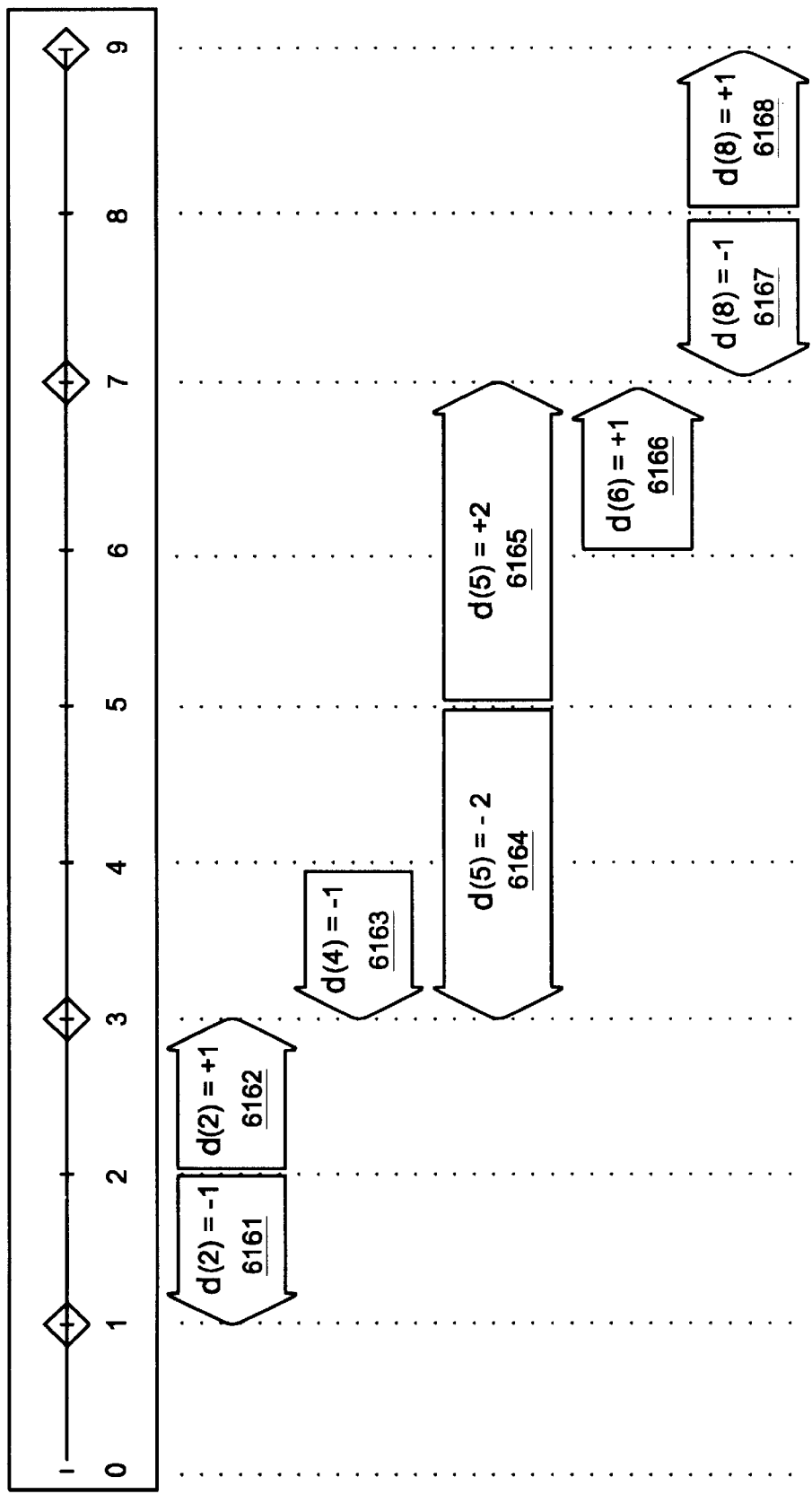
FIG. 6(b) depicts the various dink values of the mod 6 arithmetic system $Z_6$ as displacements on a finite line segment.

As for each of the other five non-modular divisors 2, 4, 5, 6 and 8, the minimum distance that each must travel to reach a true modular divisor is referred to as its dink value. First, let the dink value of a number n be denoted by d(n). In FIG. 6(b), numbered arrows are used to depict dink values of these non-modular divisors. Arrow 6161 indicates the process of dinking the integer 2 by d(2)=−1 to reach a true modular divisor 1; arrow 6162 indicates the process of dinking the integer 2 by d(2)=+1 to reach 2's other true modular divisor 3. Arrow 6163 indicates the process of dinking the integer 4 by d(4)=−1 to reach 3. Arrow 6164 indicates the process of dinking 5 by d(5)=−2 to reach the true modular divisor, namely 3; arrow 6165 indicates the process of dinking 5 by d(5)=+2 to reach the other true modular divisor, namely 7. Arrow 6166 indicates the process of dinking the integer 6 by d(6)=+1 to reach the true divisor 7. Finally, arrow 6167 indicates the process of dinking 8 by d(8)=−1 to reach the true modular divisor, namely 7; arrow 6168 indicates the process of dinking 8 by d(8)=+1 to reach the other true modular divisor. namely 9. Moreover, the maximal dink for the mod 10 system $Z_{10}$ 6050 can be visually determined from the finite number line 6100 to be 5's two dink values: −2 and +2. Consequently, maxDink (10), the maximum value of the dink for the mod 10 system $Z_{10}$ 6050 is equal to 2.

Figure 6C:
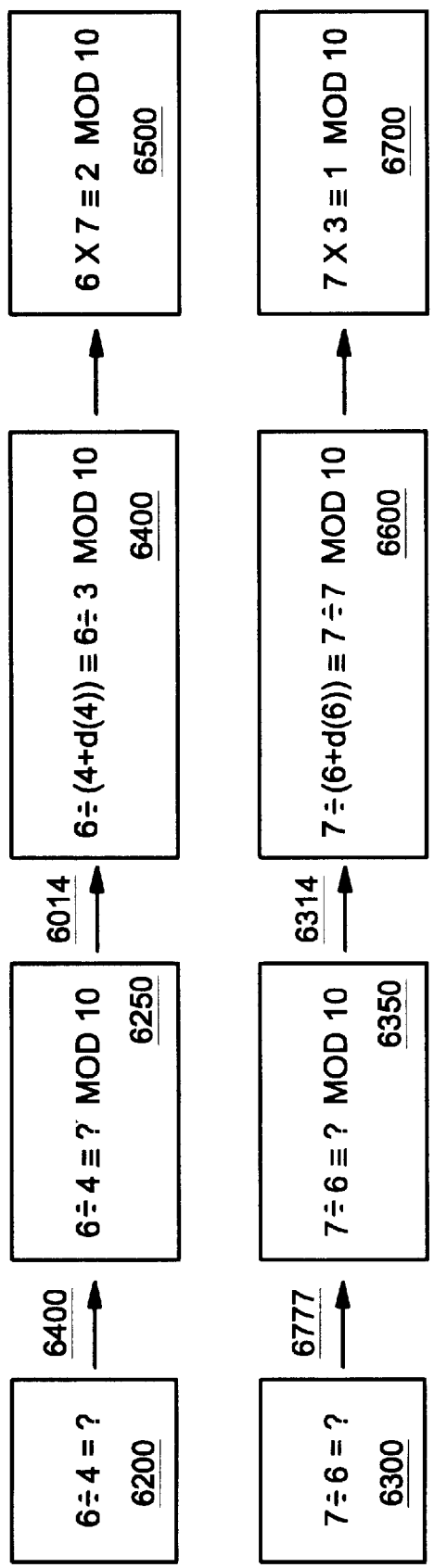
FIG. 6(c) illustrates the process of dinking within the mod 6 arithmetic system $Z_6$ for two cases of modular divisions: 4/2 mod 6 and 5/4 mod 6.

In FIG. 6(c), to illustrate the process of dinking divisions in a composite modular system such as the mod 10 system $Z_{10}$ 6050, two ordinary divisions 6÷4 6200 and 7÷6 6300 are first embedded by arrow 6444 and arrow 6777 respectively into the mod 10 system $Z_{10}$ 6050 as two modular divisions, 6÷4 mod 10, 6250 and 7÷6 mod 10, 6350.

Specifically, for the modular division 6÷4 mod 10, because the modular divisor 4 in this case is not relatively prime to the modulus 10, dinging (arrow 6014) of the modular divisor 4 is carried out. Knowing that the dink needed by 4 is −1, 4 is replaced (arrow 6014) by the new divisor 3(≡4−1), resulting in a slightly different division mod 10, 6÷3 mod 10, 6400. Finally, within the mod 10 system $Z_{10}$ 6050, the division 6÷3 is further converted to the multiplication 6*(⅓), i.e., an integer 6 multiplying a fraction ⅓. This way, since the fraction ⅓ is equivalent to the modular integer 7 within $Z_{10}$, 6*(⅓) is equivalent to 6*7 within $Z_{10}$, which is easily calculated to be equal to 6*7≡42≡2 mod 10. That is, $$6 \div 3 \equiv 6*(1/3) \equiv 6*7 \equiv \Delta \equiv 2 \mod 10, \text{ or}$$

$$6 \div 3 \equiv 2 \mod 10.$$

On the other hand, because 6, the modular divisor of 7÷6 mod 10 6350 is not relatively prime to the modulus 10, it also needs to be dinked (adjusted) (arrow 6314) to a slightly different number that is relatively prime to the modulus 10. After dinking in this case of modular division 6350, the divisor 6 is replaced by the true modular divisor 7(=6+1), resulting in a slightly different division 7÷7 mod 10, 6600. Finally, within the mod 10 system $Z_{10}$ 6050, the division 7÷7 is further converted to the multiplication 7* (1/7), i.e., an integer 7 multiplying a fraction 1/7. This way, since the fraction 1/7 is equivalent to the modular integer 3 within $Z_{10}$, 7* (1/7) is equivalent to 7*3 within $Z_{10}$, which is easily calculated to be equal to 7*3≡21≡1 mod 10. That is, $$7 \div 7 \equiv 7*(1/7) \equiv 7*3 \equiv 21 \equiv 1 \mod 10, \text{ or}$$

$$7 \div 7 \equiv 1 \mod 10.$$

The definition of modular division is the rationale for converting the modular divisor 3 to the modular multiplier ⅓≡7 within $Z_{10}$ for calculating the modular division 6÷3 mod 10 as the multiplication 6*(⅓)≡6*7 mod 10. Likewise, the same rationale applies to the above case of 7÷7 mod 10. In any modular system $Z_m$, a modular division of a÷b mod m for two modular integers a and b is first defined as a modular multiplication of a*(1/b) for a modular integer a and a modular fraction 1/b. Furthermore, this modular fraction 1/b is mathematically required to be a number such that b *(1/b)≡1 mod m. Thus, the modular fraction 1/b is defined as equivalent to a modular integer c such that b*c ≡1 mod m. Accordingly, a÷b≡a*(1/b)≡a*c mod m.

In summary, having found the four true modular divisors 1, 3, 7 and 9 in the mod 10 system $Z_{10}$ 6050 and having discovered the necessary dink value for each ambiguous modular divisor, dinking can be carried out for any division in the mod 10 system $Z_{,10}$ 6050. And finally, discovering maxDink, the maximum possible value of a dink in the the mod 10 system $Z_{10}$ 6050 allows a clear-cut quantification of the expected error bound.

Figure 7:
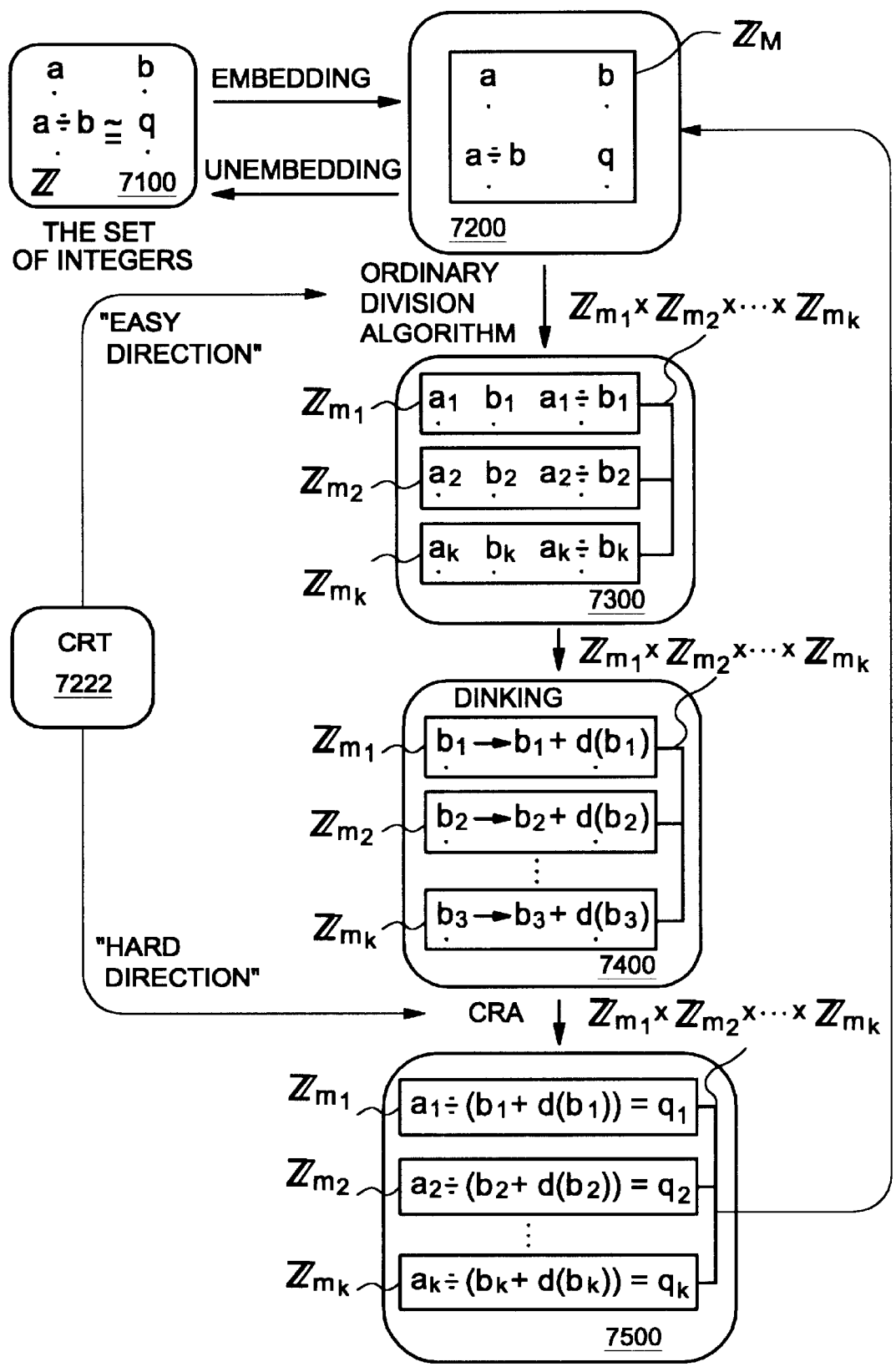
FIG. 7 illustrates the flow chart of schematic diagrams for the process of precision extension and the process of dinking [division].
Figure 8:
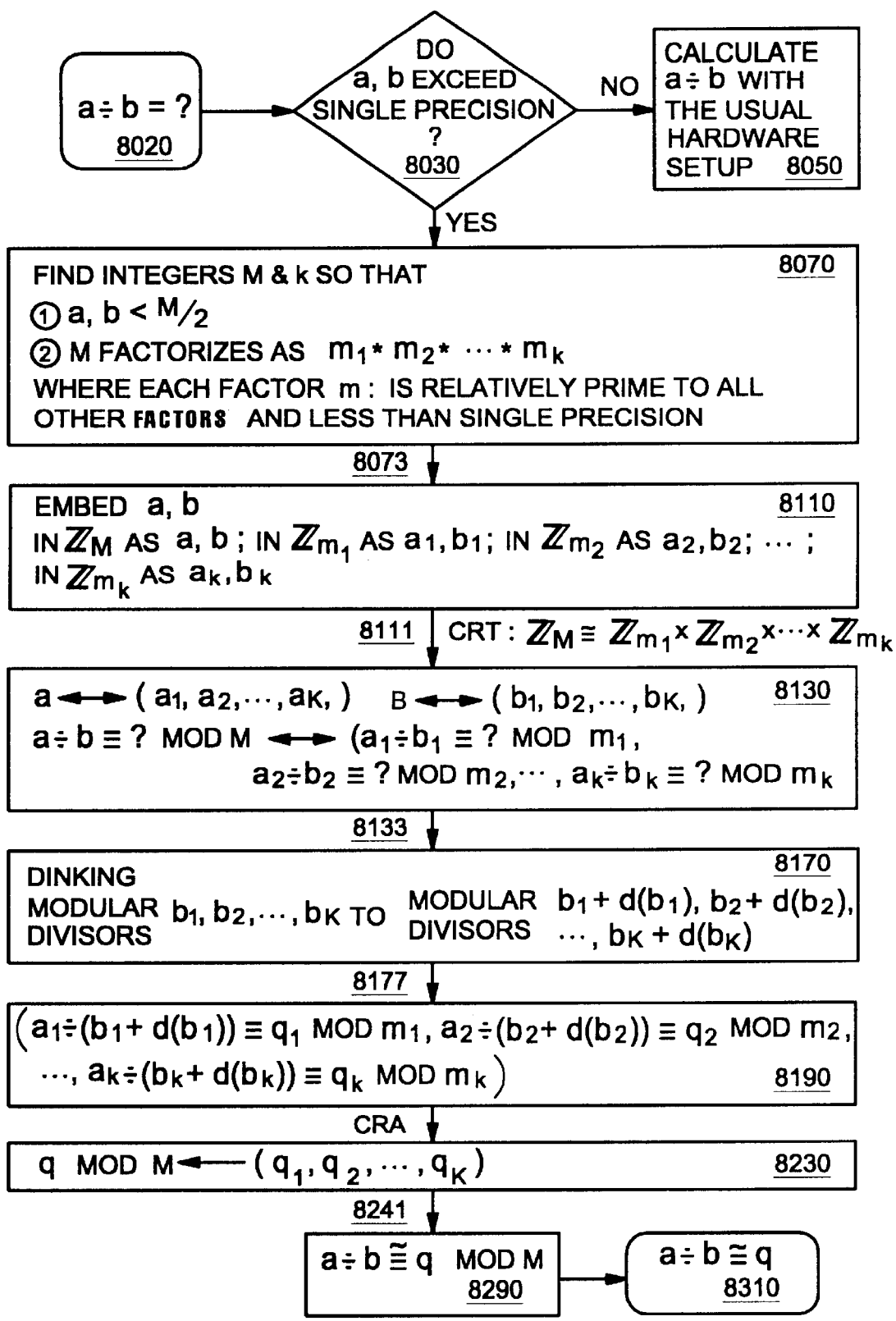
FIG. 8 illustrates the flow chart for the process of precision extension and the process of dinking [divisions].

Flow charts of the dinking process:

Having presented how dinking is done in the concrete setting of $Z_6$, two flow charts of the dinking process are now presented in FIG. 7 and FIG. 8 to summarize and consolidate the theoretical understanding of the dinking process. These two flow charts delineate the necessary steps in this embodiment of the dinking process. And together they present a gradation of increasing details that are involved in the process of dinking. First, in FIG. 7, the process of dinking is presented in "broad stroke" by a schematic flow chart, giving a general view of the essential tasks involved in dinking. Then, the flow chart in FIG. 8 fills in more details involved in the process of dinking.

In FIG. 7, the starting point for the dinking process is the world of integers Z 7100 where the quotient of the division a/b is to be computed by using a computer. Given that both a and b exceed the limit of single precision, a, b, and a/b are embedded into the world of mod M system $Z_M$ 7170. Next, CRT 7222 justifies the use of ordinary division algorithm to go from $Z_M$ 7200 to $Z_{m1}xZ_{m2}x \ldots xZ_{mk}$ 7300, so that in block 7300 a, b, and a/b coming from $Z_M$ 7200 are now represented as three k-tuples inside $Z_{m1}xZ_{m2}x \ldots xZ_{mk}$ 7300: (a1,a2, . . . , ak), (b1,b2, . . . , bk), and (a1/b1,a2/b2, . . . , ak/bk). Then the process of dinking is initiated as indicated in 7400, resulting in a k-tuple (depicted within the block 7500) of dinked and meaningful modular divisions (a1/(b1+d(b1)), . . . , ak/(bk+d(bk))) which can be computed as (q1, q2, . . . , qk). Having done the dinking and obtained (q1,q2, . . . , qk) in the block 7500, CRA (the "hard" direction) of CRT 7222 is used to reconstruct the k-tuple (q1,q2, . . . , qk)'s corresponding number in $Z_M$ 7200. Finally, instead of belonging to $Z_M$ 7200, a, b and q are now viewed once again as belonging to the world of ordinary integers Z 7100, wherein q approximates the sought after true quotient of a/b.

In FIG. 8, the question of "a÷b=?" in the block 8020 represents the division to be performed by a given computer. In the block 8030 the question is asked of whether a or b exceed the given computer's single precision. If the answer is No, then a÷b can be computed in the usual hardware setup 8050, i.e., by utilizing just one single hardware processing component. (Naturally, a÷b can also be computed via modular arithmetic and multiple processing components, although doing so is not necessary.) If the answer is Yes, then extending precision becomes necessary. Moreover, because the chosen method of extending precision here is modular representation, somewhere further down in this flowchart, the process of dinking must come into play in order to overcome the problematic issue of performing modular divisions. If it is determined that a and b exceed single precision, then as in the block 8070 the two special integers M and k are determined to satisfy two conditions: the first condition being that a, b <M/2, so that the range of representable integers lie within the interval [−M/2, +M/2]; the second condition being that M factorizes into k integers m1, m2, . . . , mk where each factor is less than a single precision and relatively prime to all the other factors, so that CRT can be applied to represent an integer via k hardware processing components. The next step involves the process of embedding a and b separately into $Z_M$, $Z_{m1}Z_{m2}x \ldots Z_{mk}$, as shown in the block 8110. At this point, through the equivalence 8111 as justified by CRT, three correspondences are presented in the block 8130 between a, b, and a÷b mod M and their respective coupled modular representations. Then the process of dinking is initiated in the block 8170, resulting in k dinked modular divisors: b1+d(b1), . . . , bk+d(bk) that are incorporated into the k-tuple of modular divisions and quotients, as presented in the block 8190. What remains to be done is reconstructing, via applying CRA, the k-tuple (q 1, q2, . . . , qk)'s corresponding number q in the mod M system $Z_M$, as depicted in the block 8230. Finally, q mod M is used to approximate a÷b mod M, as depicted in the block 8290; moreover, q can be treated as approximating the sought after true quotient of a÷b in the world of integers, as depicted in the ending block 8310.

Having illustrated a flow chart for the present invention, some embodiments of the present invention are: graphics subsystem of a computer system, texturing hardware of a computer system for supporting image processing operations, and accumulation buffers, raster engine and transformation engine of a computer system. First of all, in the case of a graphics subsystem, an embodiment of the present invention is used to extend the precision to the range necessary for very demanding and complex graphics calculation. Secondly, in the case of texturing hardware, an embodiment of the present invention is applied to perform modular divisions necessary for convolutions of data using internal multipassing. Thirdly, in the cases of accumulation buffers, raster engine and transformation engine, an embodiment of the present invention is applied to extend 12 bits precision to 24 bits.

Gauging the upper error bound of performing modular division:

In extending precision by using the methodology of modular arithmetic as complemented by the dinking process, one further important question needs to be answered. That is, can the dinked modular division give a quotient which does not approximate the original modular division within the acceptable error bound? In other words, what if for a given modular divisor b whose dink value d(b) is so large that by dinking from a/b to a/(b+d(b)), the resulting quotient strays "too far" from the true quotient sought? To set the proper context for answering this question, one embodiment of the present invention is presented in FIG. 9 that is more substantial than the previous example given in FIG. 6.

Figure 9:
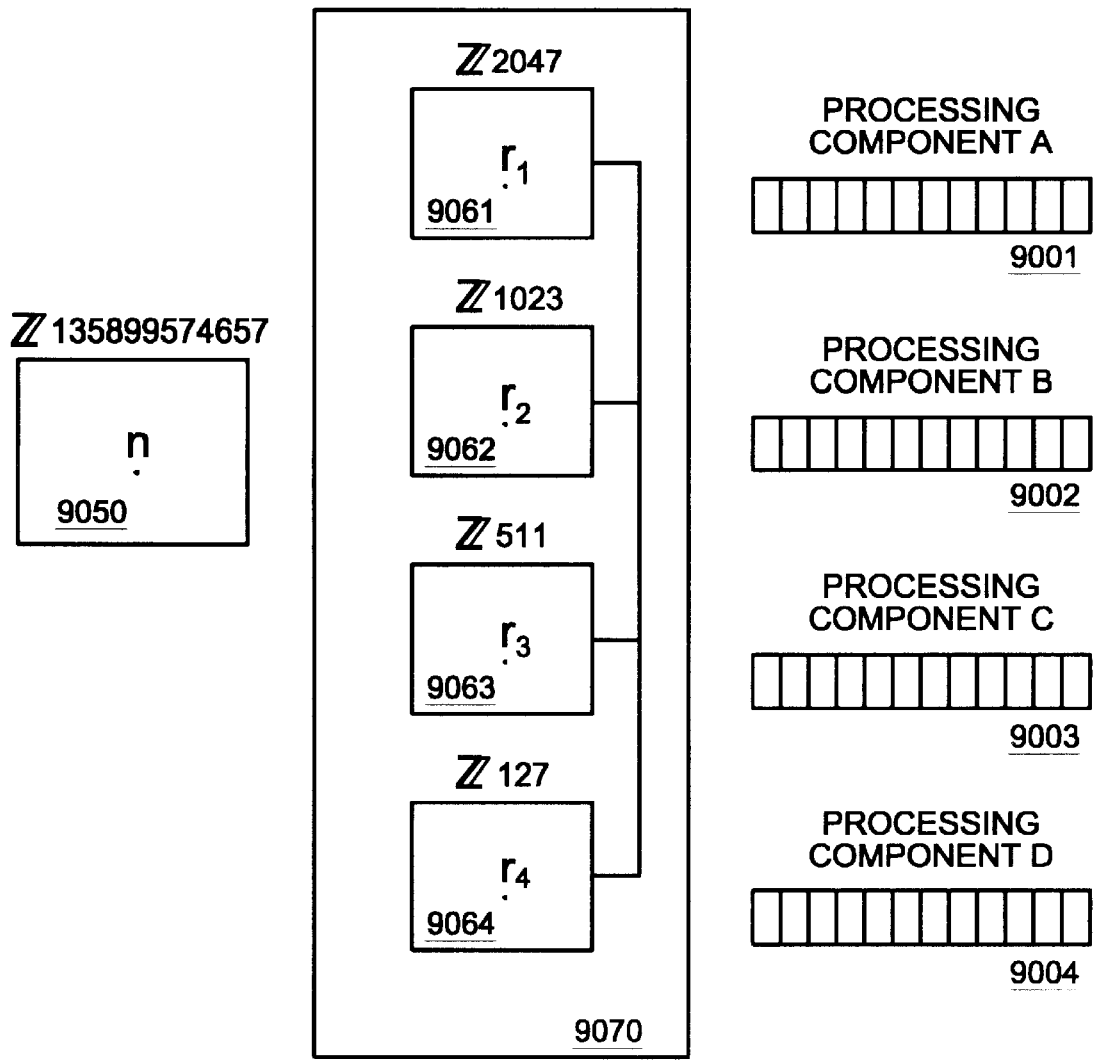
FIG. 9 illustrates the hardware implementation of four processing components used for extending single precision of $2^{12}=4096$ to a higher precision in the range of 100,000,000,000.

In FIG. 9, this particular embodiment of the present invention starts with two assumptions. The first assumption is that the required computational precision is assumed to lie somewhere in the range of 100,000,000,000. The second assumption is that each individual hardware processing component can process 12 bits bit patterns. That is to say, the single precision is 12 bits. Multiple processing components are used because the range of possible numbers far exceeds the processing capacity of each processing component. Furthermore, modular arithmetic methodology and the complementary process of dinking are both utilized to extend the computational precision. All in all, these two assumptions necessitates the specification of two integers k and M in FIG. 9 (cf. FIG. 8, block 8070). In particular, because of the first assumption, M will need to be in the range of 100,000,000,000. Secondly, k is constrained by both of these two assumptions to be 4, indicating that M is the product of 4 relatively prime integers m1, m2, m3, and m4, as in M=m1*m2*m3*m4 9011, where each factor is less than $4096=2^{12}$.

In this particular embodiment of the present invention, because k is determined to be 4, four processing components A 9001, B 9002, C 9003, and D 9004 (each of which having a single precision of 12 bits) act in unison to perform arithmetic operations on the numbers in the required range of −M/2 to +M/2. M is determined to be M=135,899,574, 657. Also, M is factored into four relatively prime integers, as in M=m1*m2*m3*m4. Moreover, each of m1, m2, m3, and m4 is chosen to be less than a single precision of $2^{12}=4096$ (the processing capacity of each processing component is $2^{12}=4096$). Specifically, $m1=2047=2^{11}-1$; $m2=1023=2^{10}-1$; $m3=511=2^{9}-1$; and $m4=127=2^{7}-1$ (see block 9012). Finally, to represent any number n within −M/2 to +M/2. the processing component A 9001 is used to store the remainder r1 of n divided by m1=2047: the processing component B 9002 is used to store the remainder r2 of n divided by m2=1023; the processing component C 9003 is used to store the remainder r3 of n divided by m3=5 11; and the processing component D 9004 is used to store the remainder r4 of n divided by m4=127. The justification for representing n as (r1, r2, r3, r4) comes from the equivalence between $Z_{135899574657}$ 9050 and $Z_{2047} \times Z_{1023} \times Z_{511} \times Z_{127}$ 9070

The particular embodiment of the present invention as introduced in FIG. 9 now provides the proper context to consider the question of how the maximum dink value will affect the acceptable error bound for performing modular divisions. Contrast the present embodiment briefly with the example in FIG. 6. Due to the small size of the mod 6 system $Z_6$, the maximum dink value, maxDink(6), from the set of dink values for the mod 6 system can be determined easily to be 2=maxDink(6) just by simple inspection. In fact, 2=maxDink(6) will then be used to determine the upper error bound for performing modular divisions. But in the more substantial modular system $Z_{135899574657}$ 9050 depicted in FIG. 9, where M=135,899,574,657, the totient function phi 9014 gives phi(M)=66,820,723,200, indicating the existence of 66,820,723,200 many meaningful modular divisors (here synonymous with integers that is relatively prime to M=135, 899,574,657) in the mod 135899574657 system, leaving M−phi(M)=69,078,851,457 many so-called non-totative integers of to M=135,899,574,657, where each non-totative integer of to M=135,899,574,657 is an integer that is not relatively prime to to M=135,899,574,657. But the function phi does not provide the crucial information of how these phi(M)=66,820,723,200 meaningful modular divisors are located or distributed on a finite segment marked sequentially with integers from 1 to M−1=135899574656, nor does the function phi indicate how far each non-totative integer of M must travel to reach its nearest totative integer of M=135899574657.

Fortunately, to find out the maximum dink value maxDink (135899574657) for $Z_{135899574657}$ 9050 in this embodiment of the present invention, a one-time only exhaustive checking on the 69,078,851,457 non-totative integers of M=135, 899,574,657 between 1 and M−1=135,899,574,656 is easily carried out to arrive at the maximum dink value of 12=maxDink(135899574657). That is, for any integer n between 1 and M−1=135,899,574,656, the dink value of n, d(n), never exceeds 12=maxDink(135899574657). Furthermore, no matter which non-totative integer is chosen to be the modular divisor b of a modular division a/b, the maximum separation between b and a meaningful modular divisor is at most equal to 12=maxDink(135899574657). Consequently, knowing the maximum dink value allows the quantification of the upper error bound when performing modular division. The smaller this maximum dink value maxDink(135899574657) is, the better approximation the dinked quotient is to the true quotient sought. In fact, depending on the particular divisions required, if the range of possible modular divisors is further reduced, the maximum dink value 12=maxDink(135899574657) may also be further reduced, resulting in a even smaller deviation from the true quotient; thus, the upper error bound is further reduced.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiment with various modification as are suited to the particular use contemplated. It is intended that the scope of the invention be defined by the Claims appended hereto and their equivalents.

What is claimed is:

1. In a computer system having a plurality of hardware elements of a fixed precision, a method for extending the computational precision of the computer system beyond the fixed precision of the hardware elements, comprising the steps of:

a) receiving a first operand and a second operand as inputs for a division to be performed by the computer system, the first and second operands being integers;

b) determining whether the first and second operands exceed the fixed precision of the hardware elements;

c) performing the division to compute an estimated result using the plurality of hardware elements adapted to implement modular division for extending the computational precision, wherein a modular representation of the second operand is selectively adjusted such that the modular division is valid, provided at least one of the first and second operands exceeds the fixed precision of the hardware elements; and d) returning the estimated result for further processing by the computer system.

2. The method as recited in claim 1 further comprising the steps of:

e) performing the division to compute an exact result using integer arithmetic without extending the computational precision, provided the first and second operands do not exceed the fixed precision of the hardware elements; and f) returning the exact result for further processing by the computer system provided said step e) is performed.

3. The method as recited in claim 1 further comprising the steps of:

g) receiving a third operand and a fourth operand as inputs for an arithmetic operation, the arithmetic operation being selected from the group consisting of addition, subtraction and multiplication;

h) determining whether the third and fourth operands exceed the fixed precision of the hardware elements;

i) performing the arithmetic operation using the plurality of hardware elements further adapted to implement modular addition, subtraction and multiplication for extending the computational precision, provided at least one of the third and fourth operands exceeds the fixed precision of the hardware elements; and j) performing the arithmetic operation using integer arithmetic without extending the computational precision, provided the third and fourth operands do not exceed the fixed precision of the hardware elements.

4. The method as recited in claim 1 wherein said step c) comprises the steps of:

c1) embedding the first and second operands in a composite modular system indexed by a non-prime modulus factorizable into k relatively prime factors, such that each of the k relatively prime factors does not exceed the fixed precision of the hardware elements;

c2) computing a first k-tuple from the first operand and a second k-tuple from the second operand, the first and second k-tuples representing k pairs of modular numbers in k modular systems having relatively prime moduli, and the k relatively prime moduli corresponding to the k relatively prime factors of the non-prime modulus of the composite modular system;

c3) dinking the second k-tuple to obtain a third k-tuple representing k dinked modular divisors in the k modular systems;

c4) computing a fourth k-tuple representing k quotients in the k modular systems, each of the k quotients being computed by dividing an entry of the first k-tuple by a corresponding entry of the third k-tuple, such that the fourth k-tuple represents the estimated result of the division of the first operand by the second operand sufficiently accurate within a predetermined range; and c5) reconstructing a representation of the estimated result in the composite modular system from the fourth k-tuple using the Chinese Remainder Algorithm.

5. The method as recited in claim 4 further comprising the step of:

c6) unembedding the representation of the estimated result in the composite modular system to obtain an integer representation of the estimated result.

6. The method as recited in claim 4 wherein said step c3) comprises the steps of:

adjusting each entry of the second k-tuple by a dink value to obtain one of the k dinked modular divisors, such that each of the k clinked modular divisors is relatively prime to the modulus of the corresponding one of the k modular systems; and representing the k dinked modular divisors as the third k-tuple.

7. The method as recited in claim 4 wherein the non-prime modulus of the composite modular system is at least twice as large as the magnitude of the larger one of the first operand and the second operand, such that all possible outcomes of the division can be represented within the composite modular system.

8. The method as recited in claim 1 wherein the method is implemented in a graphics subsystem of the computer system.

9. The method as recited in claim 1 wherein the method is implemented in texturing hardware of the computer system for supporting image processing operations including convolutions using internal multipassing.

10. The method as recited in claim 1 wherein the method is implemented in at least one of a plurality of graphic processing hardware including an accumulation buffer, a raster engine and a transform engine of the computer system, the fixed precision of the plurality of hardware elements being 12 bits and the computational precision of the computer system being at least 24 bits.

11. A computer system including a processor, an address/data bus coupled to the pressor, a computer readable memory coupled to communicate with the processor, and a plurality of hardware elements of a fixed precision, the processor for performing a method for extending the computational precision of the computer system beyond the fixed precision of the hardware elements, the computer system comprising:

input registers for receiving a first operand and a second operand as inputs for a division to be performed by the computer system, the first and second operands being integers;

a control unit for determining whether the first and second operands exceed the fixed precision of the hardware elements;

a modular arithmetic unit for performing the division to compute an estimated result using the plurality of hardware elements adapted to implement modular division for extending the computational precision, wherein a modular representation of the second operand is selectively adjusted such that the modular division is valid, provided at least one of the first and second operands exceeds the fixed precision of the hardware elements; and an output register for storing the estimated result for further processing by the computer system.

12. The computer system as recited in claim 11 further comprising:

an integer arithmetic unit for performing the division to compute an exact result without extending the computational precision, provided the first and second operands do not exceed the fixed precision of the hardware elements, wherein the output register is also for returning the exact result for further processing by the computer system.

13. The computer system as recited in claim 11 wherein:

the input registers are also for receiving a third operand and a fourth operand as inputs for an arithmetic operation, the arithmetic operation being selected from the group consisting of addition, subtraction and multiplication;

the control unit is also for determining whether the third and fourth operands exceed the fixed precision of the hardware elements;

the modular arithmetic unit is also for performing the arithmetic operation using the plurality of hardware elements further adapted to implement modular addition, subtraction and multiplication for extending the computational precision, provided at least one of the third and fourth operands exceeds the fixed precision of the hardware elements; and the integer arithmetic unit is also for performing the arithmetic operation using integer arithmetic without extending the computational precision, provided the third and fourth operands do not exceed the fixed precision of the hardware elements.

14. The computer system as recited in claim 11 wherein the modular arithmetic unit:

embeds the first and second operands in a composite modular system indexed by a non-prime modulus factorizable into k relatively prime factors, such that each of the k relatively prime factors does not exceed the fixed precision of the hardware elements;

computes a first k-tuple from the first operand and a second k-tuple from the second operand, the first and second k-tuples representing k pairs of modular numbers in k modular systems having relatively prime moduli, and the k relatively prime moduli corresponding to the k relatively prime factors of the non-prime modulus of the composite modular system;

dinks the second k-tuple to obtain a third k-tuple representing k dinked modular divisors in the k modular systems;

computes a fourth k-tuple representing k quotients in the k modular systems, each of the k quotients being computed by dividing an entry of the first k-tuple by a corresponding entry of the third k-tuple, such that the fourth k-tuple represents the estimated result of the division of the first operand by the second operand sufficiently accurate within a predetermined range; and reconstructs a representation of the estimated result in the composite modular system from the fourth k-tuple using the Chinese Remainder Algorithm.

15. The computer system as recited in claim 14 wherein the modular arithmetic unit also unembeds the representation of the estimated result in the composite modular system to obtain an integer representation of the estimated result.

16. The computer system as recited in claim 14 wherein the modular arithmetic unit:

adjusts each entry of the second k-tuple by a dink value to obtain one of the k dinked modular divisors, such that each of the k dinked modular divisors is relatively prime to the modulus of the corresponding one of the k modular systems; and represents the k dinked modular divisors as the third k-tuple.

17. The computer system as recited in claim 14 wherein the non-prime modulus of the composite modular system is at least twice as large as the magnitude of the larger one of the first operand and the second operand, such that all possible outcomes of the division can be represented within the composite modular system.

18. The computer system as recited in claim 11 wherein the modular arithmetic unit is implemented in a graphics subsystem of the computer system.

19. The computer system as recited in claim 11 wherein the modular arithmetic unit is implemented in texturing hardware of the computer system for supporting image processing operations including convolutions using internal multipassing.

20. The computer system as recited in claim 11 wherein the modular arithmetic unit is implemented in at least one of a plurality of graphic processing hardware including an accumulation buffer, a raster engine and a transform engine of the computer system, the fixed precision of the plurality of hardware elements being 12 bits and the computational precision of the computer system being at least 24 bits.

21. In a computer system having a plurality of hardware elements of a fixed precision, a method for performing modular division under an extended computational precision to compute an estimated result using the plurality of hardware elements adapted to implement modular division with dinking, the method comprising the steps of:

embedding a dividend and a divisor in a composite modular system indexed by a non-prime modulus factorizable into k relatively prime factors, the dividend and the divisor being integers, such that each of the k relatively prime factors does not exceed the fixed precision of the hardware elements;

computing a first k-tuple from the dividend and a second k-tuple from the divisor, the first and second k-tuples representing k pairs of modular numbers in k modular systems having relatively prime moduli, and the k relatively prime moduli corresponding to the k relatively prime factors of the non-prime modulus of the composite modular system;

dinking the second k-tuple to obtain a third k-tuple representing k dinked modular divisors in the k modular systems;

computing a fourth k-tuple representing k quotients in the k modular systems, each of the k quotients being computed by dividing an entry of the first k-tuple by a corresponding entry of the third k-tuple, such that the fourth k-tuple represents the estimated result of the division of the dividend by the divisor;

reconstructing a representation of the estimated result in the composite modular system from the fourth k-tuple; and returning the estimated result for further processing by the computer system.

* * * * *